United States Patent [19]

Kodjabashev et al.

[11] 4,425,594
[45] Jan. 10, 1984

[54] CERAMIC-FERRITE HEAD

[75] Inventors: Petko V. Kodjabashev; Georgi P. Malinovski; Atanas T. Atanassov, all of Sofia, Bulgaria

[73] Assignee: Obedineni Zavodi Za Zapametyavashti Ustroystva, Stara Zagora, Bulgaria

[21] Appl. No.: 306,537

[22] Filed: Sep. 28, 1981

[51] Int. Cl.³ .......................... G11B 5/10; G11B 5/11; G11B 5/12; G11B 5/22

[52] U.S. Cl. .................................. 360/129; 360/118; 360/122

[58] Field of Search ............... 360/129, 118, 121, 104, 360/120, 122; 29/603

[56] References Cited

U.S. PATENT DOCUMENTS

| | | | |
|---|---|---|---|
| 3,964,103 | 6/1976 | Thompson | 360/118 |
| 3,975,771 | 8/1976 | Lazzari | 360/104 |
| 4,176,384 | 11/1979 | Yang | 360/129 |
| 4,291,354 | 9/1981 | Chase | 360/129 |
| 4,293,883 | 10/1981 | Cox | 360/129 |
| 4,356,524 | 10/1982 | Watanabe | 360/122 |

Primary Examiner—Robert Martin Kilgore
Attorney, Agent, or Firm—Karl F. Ross; Herbert Dubno

[57] ABSTRACT

A ceramic-ferrite head for use with a flexible data-storage disk comprises a cylindrical body composed of magnetically soft ferrite and formed internally with a cup-shaped recess open at one end and a boss provided with a window at the opposite end. The core assembly is received in this boss and is bonded therein with a glass-resin composition while the coils of the assembly are found in the recess and are connected, together with the ground lead through a cap of the same material as the body, to a printed circuit board on the opposite side of this cap. The recess is lined with a conductive coating which is likewise grounded to the printed circuit board by the ground conductor.

1 Claim, 4 Drawing Figures

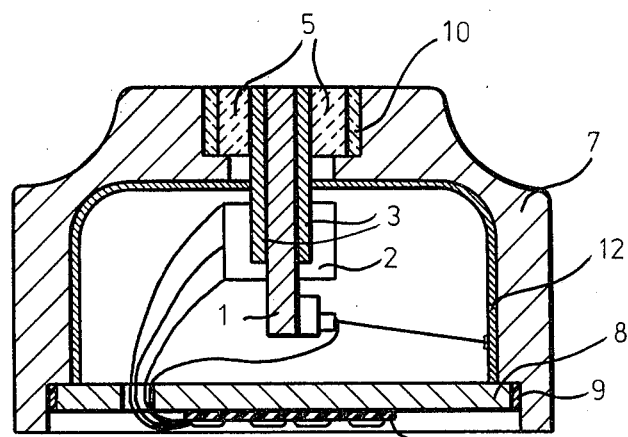
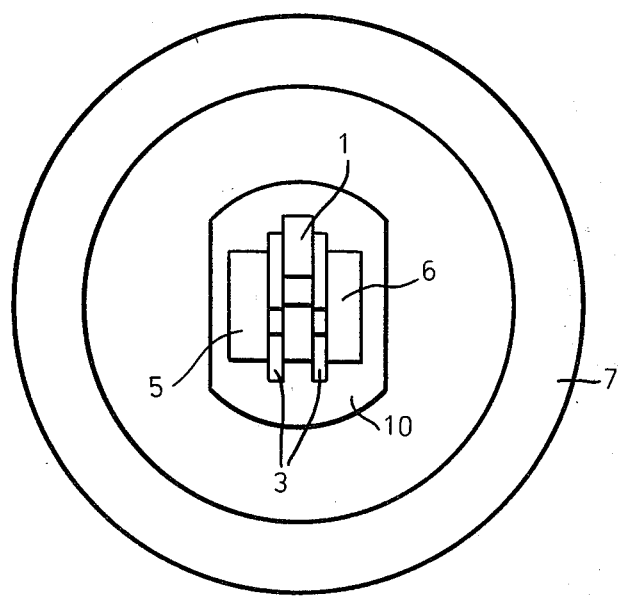

CERAMIC-FERRITE HEAD

FIELD OF THE INVENTION

This invention refers to a ceramic-ferrite head for a flexible magnetic disk (diskette) storage device, which is utilized for computers.

BACKGROUND OF THE INVENTION

A ceramic-ferrite head is known, which consists of a magnetic core assembly formed from a read/write magnetic core furnished with a coil, two erasing magnetic cores, furnished with a second coil, which have on both sides ceramic supports. The magnetic core assembly is fixed to a face opening on a plastic body, on which through pegs the leads from the coils are brought out and the assembly is connected to ground through a lead peg in the body. Around the read/write coil and the erase coil a magnetic shield is placed and the later is affixed to the body. The magnetic core axially is fixed to the body with epoxy resin. The working contact surface is part of a spherical surface.

The main disadvantages of this ceramic-ferrite head are the low density and reliability of the written and read digital information.

OBJECT OF THE INVENTION

The object of this invention is to provide a ceramic-ferrite head with increased density and reliability of recording and reading of digital information.

SUMMARY OF THE INVENTION

This is achieved by a ceramic-ferrite head, which consists of magnetic core assembly formed by a record/read magnetic core furnished with a coil, two erasing magnetic cores, furnished with a second coil, and two ceramic support wafers. The magnetic core is affixed in the face opening of the body on whose back the leads from the coils are brought out. The magnetic core assembly is connected to ground. The body is closed from the back by a cap which is made from a material which, like the material of the body, is a magnetically soft ferrite with a factor of linear expansion equal to that of the magnetic core assembly. The cap is attached to the body by an electric current conducting resin. The magnetic core set is affixed to the face opening of the body by a low-temperature glass-resin with a factor of linear expansion equal to that of the magnetic core set and the body. The leads of the coils are brought out on the cap, via an output PC board affixed to it where the ground connection of the magnetic core set is also brought out. The internal surface of the body is covered by a current conducting layer, which through the output PC board is connected to the ground.

The advantages of the ceramic-ferrite head, according to this invention, are the increased density and reliability of recording and reading digital information.

BRIEF DESCRIPTION OF THE DRAWINGS

The invention is explained in greater detail with the aid of the attached drawings in which:

FIG. 1 represents a cross-section of the ceramic-ferrite head;

FIG. 2 is a view from above of the ceramic-ferrite head;

SPECIFIC DESCRIPTION

Figure 3:
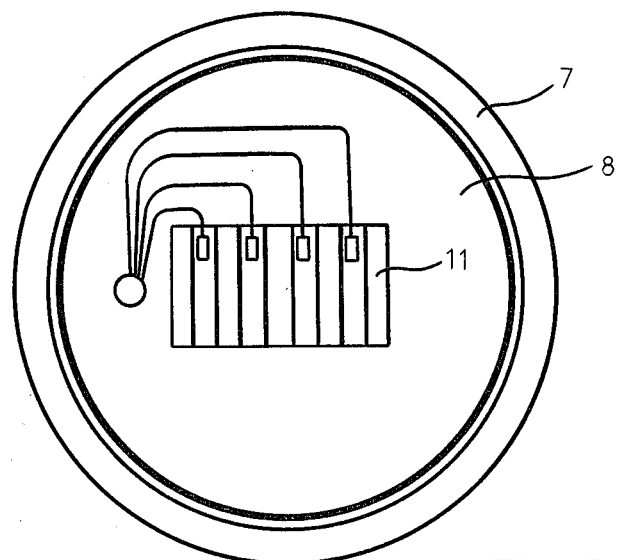
FIG. 3 is a view from below of the ceramic-ferrite head.
Figure 4:
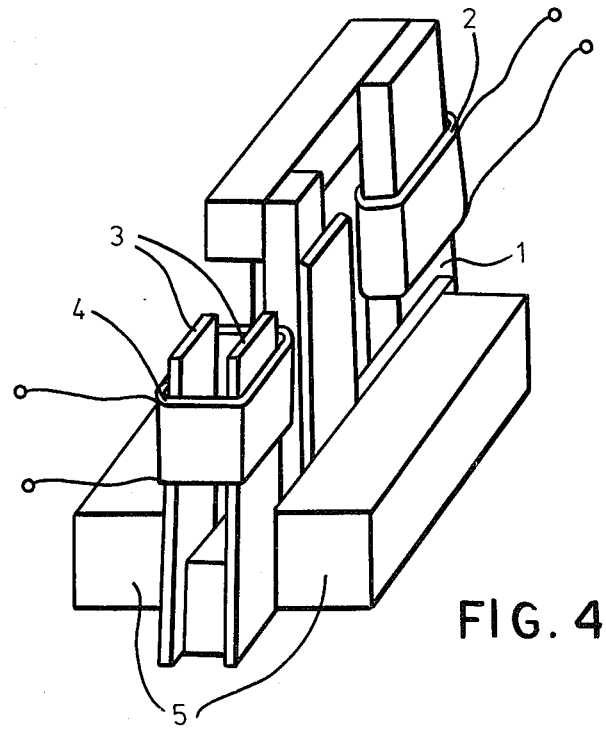
FIG. 4 is an axonometric view of the magnetic core set.

The ceramic ferrite head, according to FIGS. 1–4 consists of a magnetic core assembly, formed from a recording/reading magnetic core 1, furnished with a coil 2, and two erasing magnetic cores 3, furnished with a second coil 4 and two support ceramic wafers 5, which is affixed in a face opening 6 of a body 7, from which the leads of the coils 2 and 4 are brought out. The magnetic core set is connected to the earth, where the body 7 is closed from the back by a cap 8 which, like the material of the body 7, is magnetically soft ferrite with a factor of linear expansion equal to that of the magnetic core assembly. The cap 8 is attached to the body 7 by current conducting resin 9. The magnetic core set is affixed in the face opening 6 of the body 7 by a low-temperature glass resin 10 with a factor of linear expansion which is equal to that of the magnetic core set and the body 7. The leads of the coils 2 and 4 and brought out on the cap 6 of the body 7 by a PC board 11, on which the ground connection of the magnetic core set is also brought out. The internal surface of the body 7 is covered by a current conducting layer 12, which is connected to ground through the PC board 11.

The ceramic-ferrite head, according to this invention, functions by the following manner:

It is installed and aligned on a support in the storage device with flexible magnetic disk, it is pressed to the diskette, which rotates with a constant velocity. During recording of information, a sequence of signals is fed to the leads of the coil 2 of the record/read magnetic core 1. To the leads of the coil 4 of the erasing magnetic cores 3 a direct current is fed. The recorded information is calibrated on a precisely specified width by the erasing magnetic cores 3, after that the coil 2 is switched to read mode, while the coil 4 is switched off.

We claim:

1. A ceramic-ferrite head for use with a flexible disk information storage medium which comprises:

a cylindrically magnetically soft ferrite body provided with an internal recess opening axially at one end of said body and formed at the opposite end of said body with an axial boss having a window opening into said recess;

a magnetic core assembly affixed to said body and comprising a recording-reading magnetic core having a portion positioned in said window and another portion extending into said recess, a recording-reading coil on said other portion of said recording-reading core, a pair of erasing magnetic cores, each having a portion disposed in said window and provided with a second coil and a pair of ceramic wafers, flanking the portions of said cores disposed in said window;

a glass-resin bonding agent bonding said assembly to said wafers in said window;

a conductive layer lining said recess;

a cap of magnetically soft ferrite closing said one end of said body and having a passage communicating with said recess;

a printed circuit board affixed to said cap externally of said recess and provided with a plurality of connecting terminals and a ground terminal;

respective leads extending through said recess from said coils to said connecting terminals; and a ground lead connected to said cores and to said lining and extending to said ground terminal, said leads traversing said passage, said glass-resin, said body and said assembly all having substantially the same coefficient of linear extension.

* * * * *